United States Patent Office 2,938,915
Patented May 31, 1960

2,938,915
PRODUCTION OF NATURAL AMINOACID ARYL ESTERS WITH PHOSPHORUS ARYL ESTERS

Robert Schwyzer and Beat Iselin, Riehen, and Werner Rittel, Basel, Switzerland, assignors to Ciba Pharmaceutical Products Inc., Summit, N.J.

No Drawing. Filed Jan. 3, 1957, Ser. No. 632,270

Claims priority, application Switzerland Jan. 6, 1956

8 Claims. (Cl. 260—389)

This invention relates to a new process for the manufacture of carboxylic acid aryl esters, especially of carboxylic acid phenyl and naphthyl esters.

These carboxylic acid aryl esters react rapidly with amines with the formation of carboxylic acid amides as described for example in Belgian Patent No. 535,525 and in South African Patent No. 303/55. In particular by reaction of aminocarboxylic acid aryl esters with aminocarboxylic acids or their esters, peptides are produced in good yield. They are also especially suitable for the manufacture of linear or cyclic polypeptides, as described for example in Belgian Patent No. 552,107, e.g. for the preparation of the antibiotic gramicidin S.

For the manufacture of carboxylic acid aryl esters, hitherto the carboxylic acid had first to be converted into a reactive derivative, for example acid halide or anhydride, which was then reacted with an aromatic hydroxyl compound such as a phenol.

We have now found that the above specified esters can be produced directly from the corresponding acids, when a carboxylic acid is reacted with a phosphorous acid ester which contains as alcohol component at least one aryl radical.

The carboxylic acids used as starting material can belong to the aliphatic, aromatic, araliphatic or heterocyclic series. Aminocarboxylic acids are especially useful. For the purpose of peptide synthesis aminocarboxylic acids are eminently suitable in which the amino group is separated by 1-4 carbon atoms from the carbonyl group, as for example the natural amino-acids. The amino group is advantageously substituted, for example by acyl, such as lower fatty acid radicals, trifluoracetyl, benzoyl, p-toluenesulphonyl, carbobenzoxy or p-nitrocarbobenzoxy, acylaminoacyl, aminoacylaminoacyl, alkyl, alkylene, cycloalkyl, aryl, aralkyl such as benzyl or triphenylmethyl or heterocyclic radicas, especially by those which are commonly used in the chemistry of peptides for the protection of amino groups.

As phosphorous acid esters, both symmetrical and also asymmetrical esters can be used, for example such as contain as alcohol components in addition to the aryl radical any aliphatic radicals, since in the reaction according to the invention the carboxylic acids react preferably with the aryl radicals and among these especially with such as are substituted by an electron-attracting substituent. The specified phosphorous acid esters are either known or can be prepared by direct or step-wise reaction of phosphorus trihalides with phenols or alcohols in the presence of a tertiary base, as for example pyridine.

The aryl, particularly the phenyl radical is either unsubstituted or substituted, especially by one or more electron-attracting substituents, as for example nitro, cyano, esterified carboxyl such as carbalkoxy, carbamyl, esterified such as alkyl-esterified sulpho, sulphonyl such as alkane- or benzenesulphonyl or sulphinyl or also etherified hydroxyl such as alkoxy groups, or halogen atoms, which are preferably contained in o- or p-position to the ester bond.

The reaction of this invention is advantageously carried out in the presence of a base, especially a tertiary organic base, as for example triethylamine or pyridine, if desired in the presence of organic solvents such as chloroform or ethyl acetate. When symmetrical phosphorous acid esters are used, the molar proportion of carboxylic acid to phosphorous acid ester is advantageously 2:1, whereas with the application of asymmetrical phosphorous acid esters an equimolar proportion of the reactants is to be preferred.

The reaction can be carried out under mild conditions, which is of essential importance for the synthesis of relatively complicated aminocarboxylic acid esters. The process of the invention also gives good yields.

The following examples illustrate the invention:

Example 1

3.58 grams (0.02 mol) of hippuric acid are dissolved in 10 ml. of dry pyridine and treated with 5.34 grams (0.012 mol) of tri-p-nitrophenyl phosphite. On standing, the phosphite passes into solution within 30 minutes; after a total of 3 hours, the reaction solution is poured with stirring into 200 ml. of ice water. The separated crystals are filtered off after 1 hour and washed with cold, saturated sodium bicarbonate solution, water and alcohol: 4.78 grams (80%), M.P. 163–165° C. After recrystallisation from alcohol, the hippuric acid-p-nitrophenyl ester melts at 168–169° C.

By the use of equimolar quantities of hippuric acid and tri-p-nitrophenyl phosphite, the yield is not improved and in a proportion of 3:1 it falls to 57%.

The tri-p-nitrophenyl phosphite of M.P. 170–171° C. is a known substance.

Example 2

A solution of 209 mg. (0.001 mol) of carbobenzoxy-glycine in 0.5 mol of dry pyridine is treated with 250 mg. (0.00056 mol) of tri-p-nitrophenyl phosphite and the whole allowed to stand at room temperature for 2 hours. The reaction solution is then diluted with 10 ml. of ethyl acetate and with ice cooling washed with 2 N-hydrochloric acid, saturated sodium bicarbonate solution and water, dried and freed from solvent under reduced pressure. On treating the oily residue with ether the carbobenzoxy-glycine-p-nitrophenyl ester crystallises: 299 mg. (91%); M.P. 122–123° C. After recrystallisation from ethanol or from ethyl acetate-ether, the ester melts at 124–125° C.

If a similar batch is processed with the use of 0.16 ml. (0.002 mol) of pyridine in chloroform or ethyl acetate (2 ml.), there is obtained after a reaction period of 2½ hours at 50° C. 79% or 83% respectively of carbobenzoxy-glycine-p-nitrophenyl ester. By the application of triethylamine (0.42 ml.); 0.003 mol in 2 ml. of ethyl acetate as catalyst an equimolar ratio is to be recommended of carbobenzoxy-glycine and tri-p-nitrophenyl phosphite (yield 71%).

Example 3

2.00 grams (0.0063 mol) of trityl-glycine (M.P. 157–162° C.) are dissolved in 5.0 ml. of absolute pyridine and 1.70 grams (0.0038 mol) of tri-p-nitrophenyl phosphite added. The crystals present pass into solution after a few seconds on shaking whereby heat is evolved. After 3 hours at room temperature, the reaction mixture is poured into ice water and after 30 minutes taken up in ethyl acetate. The ethyl acetate solutions are washed with ice cold, dilute sulphuric acid, ice water and ice cold, dilute sodium carbonate solution, dried over sodium sulphate and give on evaporation 1.70 grams of crystalline residue (62% of the theoretical yield). The trityl-glycine-p-nitrophenyl ester crystallises from benzene-petroleum ether in the form of clusters of needles of M.P. 142–144° C.; after repeated crystallisation, the melting point rises to 150–155° C.

The crystals are easily soluble in benzene, ether, chloroform, ethyl acetate and alcohol and difficultly soluble in petroleum ether.

Example 4

A solution of 209 mg. (0.001 mol) of carbobenzoxy-glycine in 0.5 ml. of dry pyridine is treated with 352 mg. (0.001 mol) of ethyl-di-p-nitrophenyl phosphite of the formula:

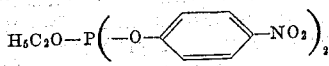

After two hours, the reaction solution is diluted with ethyl acetate and with cooling washed with 2 N-hydrochloric acid, saturated sodium bicarbonate solution and water and evaporated under vacuum. On addition of ether 284 mg. (86%) crystallise of the carbobenzoxy-glycine-p-nitrophenyl ester described in Example 2, of M.P. 120–122° C.

The ethyl-di-p-nitrophenyl phosphite used as starting material can be prepared as follows:

6.95 grams (0.05 mol) of p-nitrophenol are dissolved in a mixture of 4 ml. (0.05 mol) of dry pyridine and 75 ml. of absolute ether and treated at 0° C. with a solution of 3.68 grams (0.025 mol) of ethyl-dichloro-phosphite in 10 ml. of ether. The separated pyridine hydrochloride is filtered off and the filtrate concentrated under vacuum to a small volume and treated with petroleum ether. On standing at 0° C., 4.14 grams of crystals separate out and from the mother liquor a further 1.80 grams of crystalline material can be isolated. The crude crystals are rapidly ground with a little ice water, filtered and washed with cold alcohol: 3.08 grams; M.P. 54–57° C. After two recrystallisations from ether-petroleum ether, the substance melts at 64–69° C.

The ethyl-di-p-nitrophenyl phosphite must be kept with the exclusion of moisture, since otherwise it rapidly decomposes.

Example 5

209 mg. (0.001 mol) of carbobenzoxy-glycine are dissolved in 0.5 ml. of dry pyridine and treated with 400 mg. (0.001 mol) of phenyl-di-p-nitrophenyl phosphite. After 2 hours, the reaction solution is worked up in the manner described in Example 4, whereby 296 mg. (90%) of carbobenzoxy-glycine-p-nitrophenyl ester of M.P. 120–122° C. are isolated.

By the use of half the quantity (200 mg.; 0.0005 mol) of phenyl-di-p-nitrophenyl phosphite, under otherwise similar conditions, 250 mg. (76%) of the p-nitrophenyl ester are obtained.

The phenyl-di-p-nitrophenyl phosphite used as starting material can be prepared in the manner described in Example 4 by reaction of phenyl-dichloro-phosphite with p-nitro-phenol in the presence of pyridine. The reaction product, which is difficultly soluble in cold ether, is precipitated as a crystalline product together with the pyridine hydrochloride formed and is freed from the latter by washing with ice water and cold alcohol; yield 59%. The substance recrystallised from ether, melts at 85–86° C.

Example 6

A solution of 209 mg. (0.001 mol) of carbobenzoxy-glycine in 0.5 ml. of dry pyridine is treated with 277 mg. (0.001 mol) of o-phenylene-p-nitrophenyl phosphite of the formula:

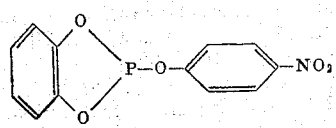

and the whole allowed to stand for 6 hours at room temperature. Working up as described in Example 4 gives 183 mg. (55%) of carbobenzoxy-glycine-p-nitrophenyl ester of M.P. 120–122° C.

The o-phenylene-p-nitrophenyl-phosphite used as starting material can be prepared as follows:

13.9 grams (0.1 mol) of p-nitrophenol are dissolved in 100 ml. of absolute ether and treated at 0° C. with 17.5 grams (0.1 mol) of o-phenylene-chloro-phosphite. To the mixture is added dropwise with stirring a solution of 10.1 grams of triethylamine (0.1 mol) in 50 ml. of absolute ether within 15 minutes. The separated triethylamine hydrochloride is filtered off after 30 minutes and from the filtrate the reaction product isolated and purified in the same manner as described in Example 4: 20.6 grams (74%); M.P. 59–63° C. After recrystallisation from ether-petroleum ether the melting point rises to 62–64° C.

Example 7

500 mg. of carbobenzoxy-glycine, 740 mg. of triphenyl phosphite and 2 ml. absolute pyridine are allowed to stand for 19 hours at room temperature and for 3 hours at 50° C. The mixture is then mixed with ether and extracted with water, 2 N-hydrochloric acid, sodium hydrogen carbonate and water, dried over sodium sulphate, and the ether evaporated. The residue is crystallized from a mixture of carbon tetrachloride and petroleum ether and yields 610 mg. of carbobenzoxy-glycine phenyl ester=89% yield. The product is identical with that described by Karrer and Heynemann in Helv. Chim. Acta 31, 398 (1948); melting point=67–68° C.

Example 8

3.9 grams of hippuric acid and 6.7 grams of triphenyl phosphite are allowed to stand in 15 ml. of absolute pyridine for 15 hours at room temperature. Part of the pyridine is evaporated in vacuo, the residue is dissolved in ethyl acetate and extracted with ice-cold 2 N-hydrochloric acid and caustic soda solution. After washing the mixture with water, it is dried over sodium sulphate and the solvent evaporated completely. The residue is crystallized from a mixture of carbon tetrachloride and petroleum ether, 2.5 grams of hippuric acid phenyl ester melting at 100–102° C. being obtained. Yield 45%.

Example 9

500 mg. of hippuric acid, 1.3 grams of tri-α-naphthyl phosphite and 2.5 ml. of absolute pyridine are allowed to stand for 2 hours at room temperature and 5 hours at 50° C. The pyridine is partially evaporated under reduced pressure, the residue is dissolved in ethyl acetate and working up is continued in the manner described in Example 8. 390 mg. of hippuric acid-α-naphthyl ester crystallize from benzene. Yield 46%. After being recrystallized twice, the substance melts at 145° C.

Example 10

5 grams of hippuric acid and 13 grams of tri-β-naphthyl phosphite are kept in 25 ml. of absolute pyridine for 25 hours at room temperature and for 2 hours at 50° C. The mixture is worked up in the manner described in Example 8. The hippuric acid-β-naphthyl ester crystallizes from a mixture of ethyl acetate and petroleum ether; the yield amounts to 4.22 grams=50%; melting point=149°C.

Example 11

800 mg. of hippuric acid, 2.17 grams of tri-(paracarbomethoxy-phenyl) phosphite and 3 ml. of absolute pyridine are allowed to stand for one day at room temperature. The mixture is worked up as described in Example 8. From ethyl acetate there are obtained 1.04 grams of hippuric acid para-carbomethoxy-phenyl ester melting at 150–151° C. Yield=74%.

The phosphite used as starting material is obtained as follows:

5.5 ml. of triethylamine in 15 ml. of tetrahydrofurane are added dropwise in the course of 30 minutes with stirring and ice-cooling to 5 grams of para-hydroxybenzoic acid methyl ester in 25 ml. of absolute tetrahydrofurane and 0.96 ml. of phosphorous trichloride. The mixture is stirred for another hour at room temperature, the tetrahydrofurane is then distilled off under reduced pressure, the residue mixed with absolute ether and the precipitated triethylammonium chloride filtered with suction. The ether filtrate is completely evaporated to dryness. The residue can neither by crystallized nor distilled. There are obtained 5.3 grams of tri-(para-carbomethoxy-phenyl) phosphite=100% yield.

*Example 12*

400 mg. of carbobenzoxy-glycine and 930 mg. of tri-(para-carbomethoxy-phenyl) phosphite are kept in 2 ml. of absolute pyridine for 16 hours at room temperature and for 2 hours at 50° C. The mixture is worked up as described in Example 8. By crystallization from carbon tetrachloride there are obtained 500 mg. of carbobenzoxy - glycine - (paracarbomethoxy - phenyl ester)=76% yield. The product melts at 121° C.

*Example 13*

320 mg. of hippuric acid and 980 mg. of tri-(para-methane sulphonyl-phenyl) phosphite are allowed to stand in 2 ml. absolute pyridine for 22 hours at room temperature. On the addition of ethyl acetate some unchanged phosphite is precipitated which is suction filtered. The filtrate is shaken with ice-cold 2 N-hydrochloric acid, saturated sodium hydrogen carbonate solution and water, dried over sodium sulphate and evaporated. 380 mg. of hippuric acid-(para-methane sulphonyl-phenyl ester) crystallize. Yield=64%. After being recrystallized once from ethanol this ester melts at 156° C.

The tri-(para-methane sulphonyl-phenyl) phosphite used as starting material can be prepared as follows:

2.9 ml. of triethylamine in 10 ml. of absolute tetrahydrofurane are added dropwise in the course of 30 minutes with stirring and ice-cooling to a mixture of 3 grams of para-hydroxyphenyl-methyl sulphone and 0.51 ml. of phosphorus trichloride in 25 ml. of absolute tetrahydrofurane. After stirring for another hour at room temperature, the tetrahydrofurane is distilled off under reduced pressure, the residue is mixed with absolute ether and the precipitate filtered with suction. The latter is freed from ether in vacuo at room temperature, then triturated with cold water, the undissolved parts are suction-filtered, washed out with water, alcohol and ether. There are obtained 2.22 grams of tri-(para-methane sulphonyl-phenyl) phosphite. Yield 70%. For the purpose of complete purification, the phosphite is dissolved in di-methyl-formamide at 30° C. and mixed rapidly with absolute methanol. The pure phosphite crystallizes in the form of white needles which melt at 185–188° C.

*Example 14*

2.2 grams of hippuric acid and 4.76 grams of tri-para-cyanophenyl phosphite are allowed to stand in 10 ml. of absolute pyridine for 17 hours at room temperature. The mixture is worked up as described in Example 8. 1.55 grams of hippuric acid-para-cyanophenyl ester crystallize from benzene. Yield=45%: melting point =142–143° C.

To prepare the tri-para-cyanophenyl phosphite 5 grams of para-hydroxybenzonitrile and 1.22 ml. of phosphorus trichloride in 25 ml. of absolute ether are mixed with 7 ml. of triethylamine in 25 ml. of absolute ether with ice-cooling. The precipitate is filtered with suction, then washed with water, alcohol and ether. There are obtained 4.76 grams of crude tri-para-cyanophenyl phosphite; yield=88%. The easily decomposing product can be reprecipitated from a mixture of benzene, ether and petroleum ether. Melting point=127–129° C.

What is claimed is:

1. A process for the manufacture of carboxylic acid aryl esters, wherein a natural amino carboxylic acid is reacted with a phosphorous acid aryl ester the aryl radical of which is a member selected from the group consisting of monocyclic and bicyclic aryl radicals, said aryl radicals being selected from the class consisting of unsubstituted aryl radicals and aryl radicals substituted by a member of the group consisting of nitro, cyano, carbalkoxy and sulfonyl substituents and said carboxylic acid being devoid of reactive groups other than the carboxylic group to be esterified.

2. A process for the manufacture of carboxylic acid aryl esters, wherein a natural amino carboxylic acid is reacted in the presence of a tertiary organic base with a phosphorous acid aryl ester the aryl radical of which is selected from the group consisting of monocyclic and bicyclic aryl radicals, said aryl radicals, being selected from the class consisting of unsubstituted aryl radicals and aryl radicals substituted by a member of the group consisting of nitro, cyano, carbalkoxy and sulfonyl substituents and said carboxylic acid being devoid of reactive groups other than the carboxylic group to be esterified.

3. A process for the manufacture of carboxylic acid aryl esters, wherein a natural amino carboxylic acid having no free reactive group other than the carboxylic group to be esterified is reacted in the presence of pyridine with a phosphorous acid phenyl ester.

4. A process for the manufacture of carboxylic acid aryl esters, wherein a natural amino carboxylic acid whose amino group is protected by at least one substituent is reacted with a phosphorous acid unsubstituted monocyclic aryl ester.

5. A process for the manufacture of carboxylic acid aryl esters, wherein a natural α-amino carboxylic acid having a protected amino group, is reacted in the presence of a tertiary organic base with a phosphorous acid aryl ester the aryl radical of which is selected from the group consisting of monocyclic and bicyclic aryl radicals, said aryl radicals being selected from the class consisting of unsubstituted aryl radicals and aryl radicals substituted by a member of the group consisting of nitro, cyano, carbalkoxy and sulfonyl substituents and said carboxylic acid being devoid of reactive groups other than the carboxylic group to be esterified.

6. A process for the manufacture of carboxylic acid aryl esters, wherein a natural α-amino carboxylic acid having a protected amino group, is reacted in the presence of pyridine with a phosphorous acid aryl ester the aryl radical of which is selected from the group consisting of monocyclic and bicyclic aryl radicals, said aryl radicals being selected from the class consisting of unsubstituted aryl radicals and aryl radicals substituted by a member of the group consisting of nitro, cyano, carbalkoxy and sulfonyl substituents and said carboxylic acid being devoid of reactive groups other than the carboxylic group to be esterified.

7. A process for the manufacture of carboxylic acid aryl esters, wherein a natural α-amino carboxylic acid having a protected amino group, is reacted in the presence of pyridine with tri-p-nitrophenyl phosphite to produce a p-nitrophenyl ester of the natural α-amino acid.

8. A process for the manufacture of carboxylic acid aryl esters, wherein a natural α-amino carboxylic acid having a protected amino group, is reacted in the presence of pyridine with ethyl-di-p-nitrophenyl phosphite to produce a p-nitrophenyl ester of the natural α-amino acid.

References Cited in the file of this patent

UNITED STATES PATENTS

| | | |
|---|---|---|
| 2,617,794 | Anderson | Nov. 11, 1952 |
| 2,622,071 | Harrison | Dec. 16, 1952 |

FOREIGN PATENTS

| | | |
|---|---|---|
| 588,833 | Great Britain | June 4, 1947 |

OTHER REFERENCES

Kosolapoff, "Organophosphorus Compounds," pp. 191-2 J. Wiley 1950.